United States Patent

Kim et al.

[11] Patent Number: 5,824,262
[45] Date of Patent: Oct. 20, 1998

[54] METHOD FOR PREPARATION OF A CATALYST FOR PURIFYING EXHAUST GAS

[75] Inventors: Sang-Ho Kim, Seoul; Kyu-Hun Choi, Puch'On; Sok-Jin Chung, Yong'In-Kun, all of Rep. of Korea

[73] Assignee: Kia Motors Corporation, Seoul, Rep. of Korea

[21] Appl. No.: 606,247

[22] Filed: Feb. 23, 1996

[30] Foreign Application Priority Data

Nov. 3, 1995 [KR]   Rep. of Korea ................... 1995/39603

[51] Int. Cl.[6] .................................................. C04B 33/32
[52] U.S. Cl. ......................... 264/661; 264/653; 264/662; 423/593; 501/780
[58] Field of Search ............... 264/65, 66, 653, 264/661, 662; 423/593; 505/739, 742, 780, 822

[56] References Cited

U.S. PATENT DOCUMENTS

| | | | |
|---|---|---|---|
| 3,702,886 | 11/1972 | Argauer et al. | |
| 4,297,328 | 10/1981 | Ritscher et al. | |
| 5,036,043 | 7/1991 | Subramanian | 264/65 |
| 5,077,268 | 12/1991 | Clark | 505/739 |
| 5,077,272 | 12/1991 | Chen | 505/742 |
| 5,206,211 | 4/1993 | Meyer | 264/65 |
| 5,232,904 | 8/1993 | Wenger | 505/780 |
| 5,232,964 | 8/1993 | Wenger | 505/1 |
| 5,340,794 | 8/1994 | Tallon | 505/500 |

OTHER PUBLICATIONS

Kenji Tabata et al, Uptake of NO Gas by $YBa_2Cu_3O_y$, The Chemical Society of Japan, 1988, Chemical Letters, pp. 790–802.

*Primary Examiner*—James Derrington
*Attorney, Agent, or Firm*—Lowe Hauptman Gopstein Gilman & Berner

[57] ABSTRACT

These methods relate to the preparation of a $YBa_2Cu_3O_7$-d catalyst for purifying an exhaust gas. The method comprises steps of mixing $Y_2O_3$, $Ba_2CO_3$ and CuO at a mole ratio of 1:4:6, respectively; grinding the resultant mixture to obtain fine powder having a size of at least 200 mesh; sintering the fine powder at temperature of 800° C. to 900° C. under an atmosphere of oxygen; annealing the fine powder to room temperature; pelletizing the powder to form pellets; grinding the pellets to obtain fine powder having a size of at least 200 mesh; re-sintering the resultant fine powder at a temperature of 800° C. to 920° C.; and re-annealing the fine powder to room temperature.

6 Claims, 5 Drawing Sheets

METHOD FOR PREPARATION OF A CATALYST FOR PURIFYING EXHAUST GAS

BACKGROUND OF THE INVENTION

1. Field of the Invention

The present invention generally relates to a preparing method of an exhaust gas-purifying catalyst that is especially suitable in eliminating nitrogen oxide ($NO_x$) from an exhaust gas from an automobile, boiler, or similar device, and more particularly to preparing a method of Perovskite-type catalyst for purifying $NO_x$ in the exhaust gas emitted from a lean burn engine in the automobile.

2. Description of the Prior Art

Recently, atmospheric contamination from automobile exhaust gas accounts for the major portion of environmental problems, and the number of automobiles continues to increase with industrial development. Environmental restrictions on the amount of atmospheric contamination emitted in the form of exhaust gas are introduced every day. To restrict exhaust emissions, automobile manufacturers world wide have an interest in the development and common use of the lean burn engine which has been known as being most preferable in terms of fuel economy and exhaust reduction.

As well known in the art, a theoretical air/fuel (A/F) ratio of the typical automobile is 14.7 whereas the lean burn engine has an increased A/F ratio between 18 and 24. In the lean burn engine, amounts of $NO_x$ and CO are considerably reduced with an increase of the A/F ratio, but the reduced value still comes short of the required standards to restrict exhaust gas emissions.

Therefore, in studies being recently carried out, zeolite class catalyst are disclosed, in particular, metal ion-exchanged ZSM-5 catalysts, have a superior ability for the removal of $NO_x$ or HC to such and extent that it could not be accomplished with the three-way catalyst found in the lean burn region of A/F ratio between 18 and 24.

Synthesis of the ZSM-5 catalyst is described in U.S. Pat. No. 3,702,886. Among the metal ion-exchanged ZSM-5 catalyst, Cu-ZSM-5 catalyst as described in U.S. Pat. No. 4,297,328 is typically used.

However, in the case of the Cu-ZSM-5 catalyst, though the direct dissolution reaction of NO and the selectivity to $N_2$ are good, there are serious shortcomings in that the level of activity is significantly decreased in the presence of excess oxygen that is naturally present in the lean burn engine, and the catalyst becomes significantly less effective when water vapor is also present. To overcome such shortcomings, a Pt-ZSM-5 catalyst is proposed which shows strong features under conditions of excess oxygen and water vapor, but is inferior, nevertheless, to the Cu-ZSM-5 catalyst in terms of total activity.

Most recently, regarding the development of a catalyst with good oxygen and moisture resistance, and improved $NO_x$ purifying ability, studies have rapidly progressed in the application of a No absorption-type compound oxide of Perovskite structure as a catalyst apart from the zeolite class. The No absorption-type compound oxide can easily adjust the catalyst performance and has durability at high temperatures. Furthermore, the oxygen storage performance by the absorption and release of oxygen when it is used with the noble metal catalyst. For example, use of $YBa_2Cu_3O_y$ catalyst for removing $NO_x$ from the exhaust gas has disclosed in an article by Makato Misono, et al. entitled "Uptake of NO gas by $YBa_2Cu_3O_y$". The Chemical Society of Japan, Chemical Letters, pp. 790–802 (1988). The disclosed $YBa_2Cu_3O_y$ where y=6.88 was prepared by heating the mixture of CuO, $Y_2O_3$ and $BaCO_3$ at a temperature of 1073° K for 5 hours and then at 1196° K for 10 hours, and cooling to room temperature for 12 hours. However, the purifying efficiency of $No_x$ using the prepared catalyst was found to be below 40%. Thus, the present inventors have found that the preparing method of $YBa_2Cu_3O_y$ has a considerable effect on the purifying efficiency, water resistance, and oxygen resistance of the prepared $YBA_2CU_3O_y$, as a result of the study to enhance the purifying efficiency of $No_x$,

SUMMARY OF THE INVENTION

It is therefore an object of this invention to provide a method for preparing an exhaust gas-purifying $YBa_2Cu_3O_7$-d catalyst in which the purifying efficiency is high and the activity is not decreased even in the presence of water vapor and excess oxygen.

To achieve the object, the method for preparing the exhaust gas-purifying $YBa_2Cu_3O_7$-d catalyst in accordance to an embodiment of the present invention, comprises the steps of: (a) mixing $Y_2O_3$, $Ba_2CO_3$ and CuO at a mole ratio of 1:4:6, respectively to prepare a mixture; (b) grinding the resultant mixture to obtained fine powder; (c) sintering the fine powder obtain in the grinding step; (d) annealing the fine powder from the sintering step to room temperature; (e) pelletizing the powder to obtain pellets; (f) grinding the pellets to obtain fine powder; (g) re-sintering the fine powder obtained in the grinding; and (h) re-annealing the fine powder from the re-sintering step to room temperature.

The catalyst prepared in accordance with the above mentioned method has improved purifying efficiency of $No_x$ in the presence of water vapor and excess oxygen when compared to the catalyst prepared in accordance with the conventional co-precipitation method. Thus, the catalyst of the invention is especially efficient in removing $No_x$ with the presence of excess oxygen and water vapor in exhaust gas from automobiles, boilers, and similar devices, and in particular, from the lean burn engine of an automobile.

It is preferable for the method according to the invention that after the steps are completed once, the last four steps of the method are repeated three or more times to increase the conversion of the precursors into the final product, and thereby increase the purifying efficiency of $No_x$. The method, without the repetition of the last four steps, can still provide a $YBa_2Cu_3O_7$-d catalyst having higher purifying efficiency of $No_x$ compared to the catalyst prepared in accordance with the conventional co-precipitation method.

Moreover, in the grinding step, it is preferable that the grinder is used for the grinding and the size of the ground powder is preferably above 200 mesh. The time required for the grinding step is between 9 hours and 11 hours, and is preferably about 10 hours.

The sintering step is preferably carried out in an oxygen atmosphere, although this step can be also carried out in normal air. The sintering step temperature is between 800° C. and 900° C., and preferably about 850° C. The sintering time is 2 hours to 4 hours, and preferably about 3 hours. After the annealing step to the room temperature and the grinding by the grinder are sequentially performed, the pelletizing step is carried out by pressing. The pellets obtained by the pressing step are subjected to a re-sintering step wherein the re-sintering temperature is 800° C. to 920° C., and is preferably about 900° C. The corresponding re-sintering time 2 hours to 4 hours, and is preferably about 3 hours.

Catalysts, prepared by methods according to the embodiments of the invention, are not restricted to a particular shape or type, and therefore, can be used in various shapes or types. As a preferred use example, the catalyst according to the method of the invention can be used in a shape coated on a suitable refractory substrate such as a monolithic substrate made of codierite or stainless steel.

BRIEF DESCRIPTION OF THE DRAWINGS

These and other features, aspects, and advantages of the present invention will be better understood with reference to the following description, appended claims, and accompanying drawings where:

DETAILED DESCRIPTION OF THE INVENTION

Figure 1:
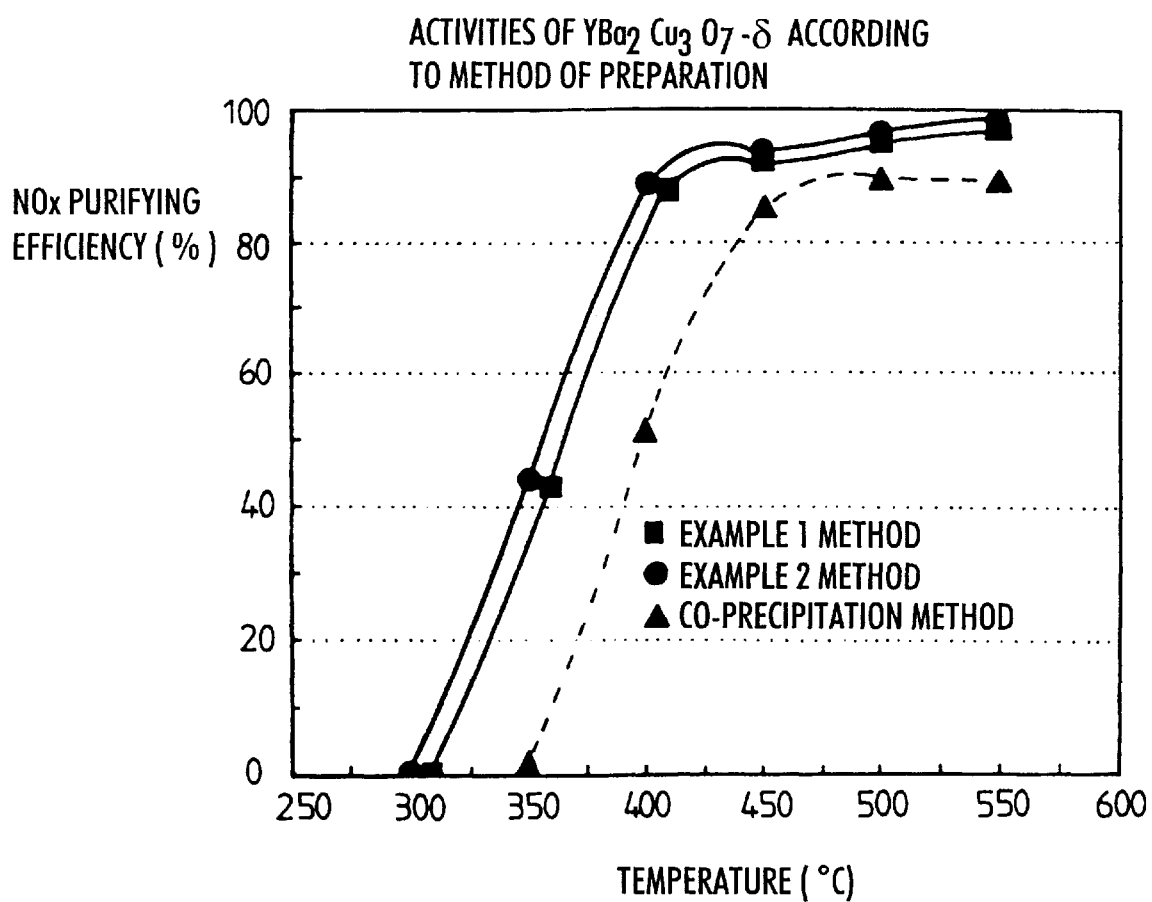
FIG. 1 is a graph showing the activity of $YBa_2Cu_3O_7$-d prepared in accordance with examples of the invention compared to the activity of $YBa_2Cu_3O_7$-d prepared in accordance with the conventional co-precipitation method (comparative example)

The present invention will be described below in more detail by way of the following examples.

Example 1

2.258 grams of $Y_2O_3$, 7.893 grams of $BaCO_3$ and 8.5854 grams of Cuo are mixed. The resultant mixture is ground in the grinder for 10 hours to obtain a fine powder having a grain size of 200 mesh or more. The fine powder is then sintered a temperature of 850° C. under an atmosphere of oxygen for 3 hours. Thereafter, the powder is annealed to room temperature and then pelletized by pressing to obtain pellets. The pellets thus obtained are ground in the grinder for 10 hours to obtain fine powder, the size of which is 200 mesh or more. The fine powder is then resintered at a temperature of 900° C. for 3 hours and slowly re-annealed to room temperature to obtain the desired Perovskite-type $YBa_2Cu_3O_7$-d.

Example 2

2.258 grams of $Y_2O_3$, 7.893 grams of $BaCO_3$ and 8.5854 grams of Cuo are mixed. The resultant mixture is ground in the grinder for 10 hours to obtain a fine powder having a grain size of 200 mesh or more. The fine powder is then sintered at temperature of 850° C. under an atmosphere of oxygen for 3 hours. Thereafter, the powder is annealed to room temperature and then pelletized by pressing to obtain pellets. The pellets thus obtained are ground in the grinder for 10 hours to obtain fine powder, the size of which is 200 mesh or more. The fine powder is then re-sintered at a temperature of 900° C. for 3 hours and slowly re-annealed to room temperature. Thereafter, the following fours steps are repeated three times over to obtain the desired Perovskite-type $YBa_2Cu_3O_7$-d: pelletization of the powder; grinding of the pellets for 10 hours to obtain fine powder having a grain size of 200 mesh or more; re-sintering of the fine powder at temperature of 900° C. for 3 hours; and re-annealing to room temperature.

Comparative Example

For comparison of the activities of catalysts prepared in Examples 1 and 2 to the activity of the conventional $YBa_2Cu_3O_7$-d catalyst prepared in accordance with the co-precipitation method, the conventional $YBa_2Cu_3O_7$-d, catalyst is prepared according to the following method.

First, 1 mole of yttrium nitrate, 2 moles of barium carbonate and 3 moles of cupric acetate are mixed. The resultant mixture is then dissolved in 300 ml of pure water forming an aqueous solution. 10 grams of citric acid and 200 ml of ethylene glycol are then added to the aqueous solution in order to precipitate the compound oxide of Y, Ba and Cum while the mixture is then titrated with aqueous ammonia to adjust pH of the mixture to 7.5. Thereafter, the mixture is filtered to obtain a wet cake. The wet cake is dried at a temperature of 120° C. for 12 hours and, after drying, is sintered at a temperature of 850° C. for 3 hours. The sintered material is then annealed to room temperature, pelletized, ground, and then re-sintered at a temperature of 900° C. After re-annealing is carried out, $YBa_2Cu_{3O7}$ is obtained.

Evaluation of the Catalysts

Before moving forward, it should be mentioned that in the zero Screening Test, apparatus consisting of a mixing tank, a reactor, a gas analyzer were manufactured with the conventional construction well known in the art. Moreover, in the zero Screening Test, to simulate the exhaust gas from the lean burn engine, the activity test was performed by thoroughly mixing each gas component in the mixing tank and passing the resultant mixture through the reactor to measure the change of concentration before and after passing the reactor from analytical instrument of each component. The reaction temperature was 250° to 550° C., with the temperature increasing at a rate of 0.5° C./min. In addition, 0.3 grams of catalyst were used. The composition of exhaust gas used was comprised of 500 PPM NO, 1000 PPM CO, 1000 PPM $C_3H_6$, 4% $O_2$, 10% $H_2O$ and the balance of $N_2$.

In analysis, $No_x$ and oxygen gas, among the reaction mixture that passed through the reactor, were analyzed by the gas analyzer (manufactured by HORIBA, Japan; model No. CLA510SS), and CO gas was analyzed by a stack gas analyzer (manufactured by ENERAC of USA; model No. 2000) and automotive emission analyzer (manufactured by HORIBA, Japan: model name: MEXA 594 GE).

Hydrocarbons that passed through the reaction mixture were analyzed by gas chromatography (manufactured by GowMac of USA; model name 750p,column:chromosorb 101, detector: FID) and automotive emission analyzer (manufactured by HORBIA, Japan; model name: MEXA 574GE).

1. Comparison between activities $YBa_2Cu_3O_7$-d catalysts differing in their method of preparation.

After each of the $YBa_2Cu_3O_7$-d catalysts was produced in accordance with Examples 1 and 2, and the comparative example was coated on each of the monoliths, the monoliths were placed on the exit side of a reactor in a system for the simulated gas test, and the test for activities of the catalysts was carried out. Test results are shown in FIG. 1. As shown in this figure, each of the activities of $YBa_2Cu_3O_7$-d catalysts, produced in accordance with example 1 and 2, is higher by 10% than the activity of the other catalyst produced in accordance with the comparative example. In addition, it can also be seen that each of the activities of $YBa_2Cu_3O_7$-d catalysts, produced in accordance with examples 1 and 2, closely approaches a level of 100% activity. It is thus evident from this test result that the method of preparation of a catalyst according to the invention considerably has an effect on the level of activity of the catalyst.

2. Comparison between Light-off Temperatures.

Figure 2:
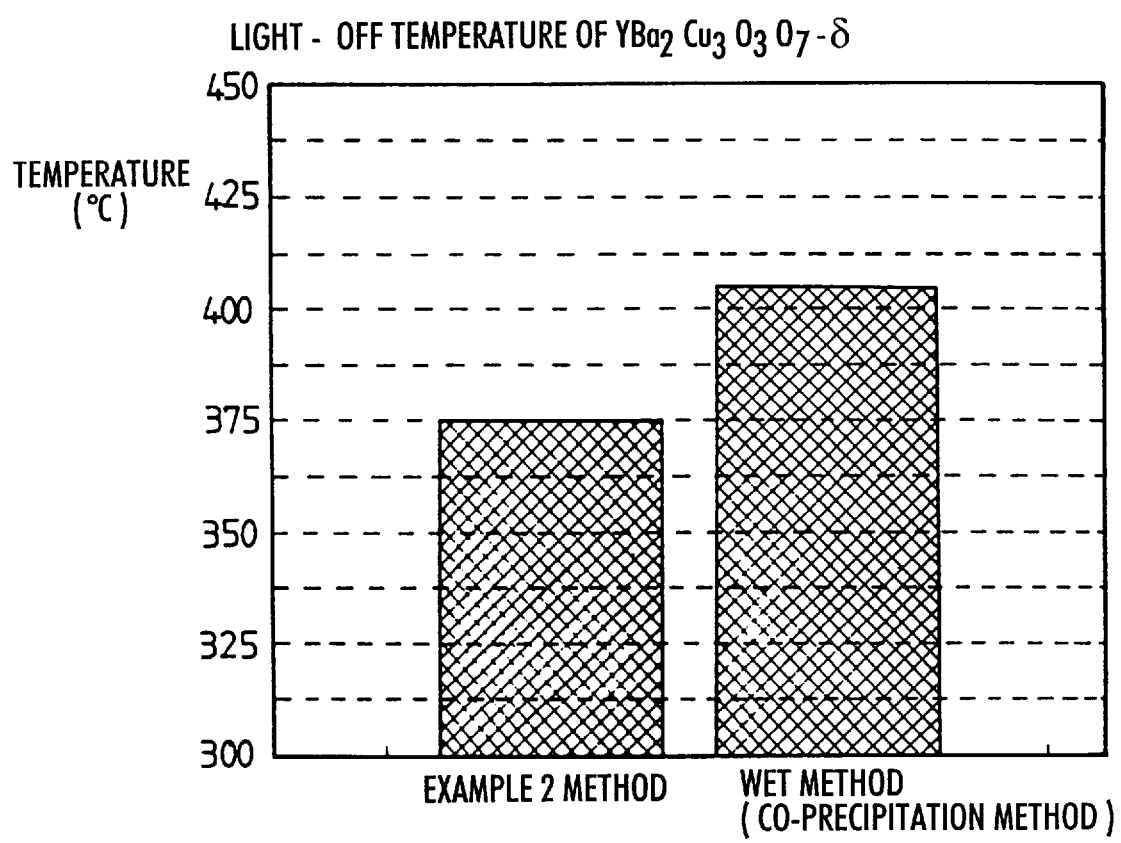
FIG. 2 is a graph comparing Light-off Temperature of $YBa_2Cu_3O_7$-d prepared in accordance with example 2 of the invention with that of the conventional co-precipitation method (comparative example)

FIG. 2 is a graph showing the comparison of Light-off Temperatures between the catalyst produced in Example 2 and the catalyst produced in comparative example. In general, the Light-off Temperatures can provide an evaluation of the level of activity for a catalyst at low temperature with a lower Light-off Temperature meaning a higher level of activity.

As shown in FIG. 2, the Light-off Temperature of a catalyst produced in example 2 is about 375° C. which is lower by about 30° C. than the Light-off Temperature of the catalyst produced in the comparative example. Therefore, the catalyst produced in example 2 using the molten method is a superior Perovskite-type catalyst in comparison with the catalyst produced in the comparative example because the catalyst produced in example 2 can considerably reduce the generation of $No_x$ even starting at lower temperatures.

3. Test of double bed catalyst (monolith) of $YBa_2Cu_3O_7$-d and three-way catalyst.

$YBa_2Cu_3O_7$-d catalyst produced in accordance with example 2 was coated on the monolith by sol-Gel technique to prepare a $YBa_2Cu_3O_7$-d monolith or double bed catalyst, while the conventional three-way catalyst of same size was provided to obtain $YBa_2Cu_3O_7$-d-three-way catalyst. The $YBa_2Cu_3O_7$-d-monolith and the $YBa_2Cu_3O_7$-d-three way catalyst were simultaneously introduced into the reactor and then measured for their activities.

Figure 3:
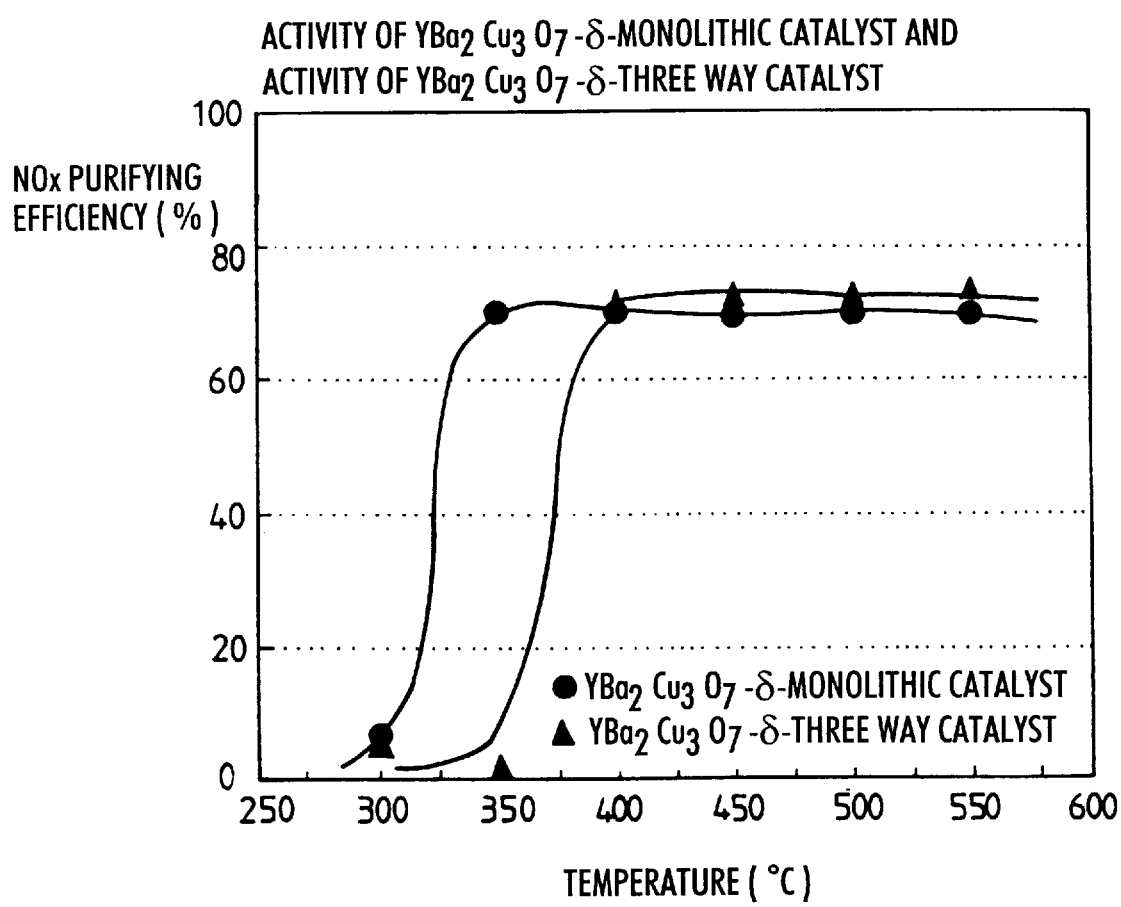
FIG. 3 is a graph comparing the activity of $YBa_2Cu_3O_7$-d-monolithic catalyst with that of $YBa_2Cu_3O_7$-d-three way catalyst.

The measured result for the activities are shown in FIG. 3. As shown in this figure, the activity behavior of the catalyst, comprised of $YBa_2Cu_3O_7$-d only, is similar to the level of activity of the double bed catalyst under the condition of lean burn. The double bed catalyst, however, has a different phenomenon in that the activity at low temperature moves toward high temperature to raise the Light-off Temperature. It will be understood, however, that the double bed type can be used as the absorption type catalyst because it can maintain $No_x$ conversion of about 70% at temperature of 400° C. which is equal to the temperature of the catalytic bed in the multiconverter.

4. TPD analysis of $YBa_2Cu_3O_7$-d Catalyst

Figure 4:
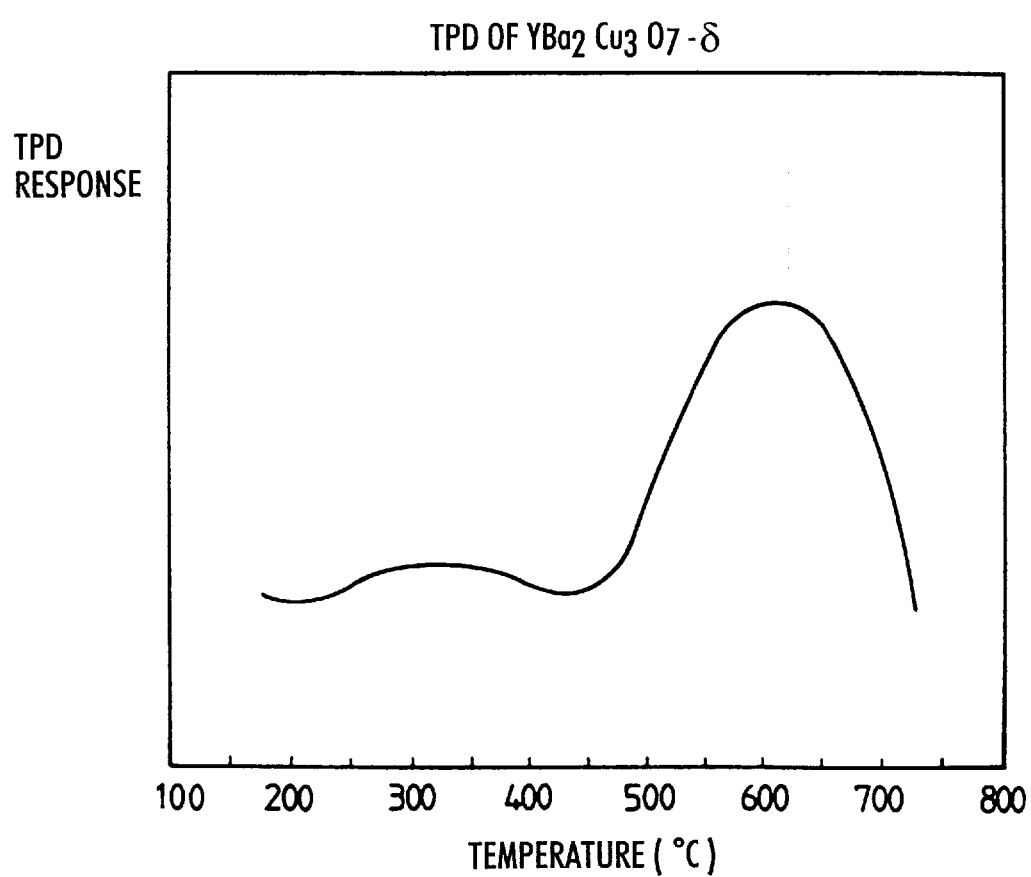
FIG. 4 is a graph showing $No_x$ TPD results by which the absorption and release abilities of $YBa_2Cu_3O_7$-d prepared in example 2 of the invention are indicated.

In order to confirm the absorption and releasing abilities of $YBa_2Cu_3O_7$-d catalyst prepared according to example 2, a NO TPD analysis was performed. FIG. 4 is a graph showing the result of the NO TPD analysis. As can be seen from FIG. 4, a great NO release peak was shown to start from a temperature of about 400° C. or more. It is therefore concluded that $YBa_2Cu_3O_7$-d catalyst produced in example 2 can be used as the absorption-type catalyst because its NO absorption ability is excellent at a temperature of about 400° C. which is equal to the temperature of the catalytic bed in the multiconverter.

5. Engine bench test.

Figure 5:
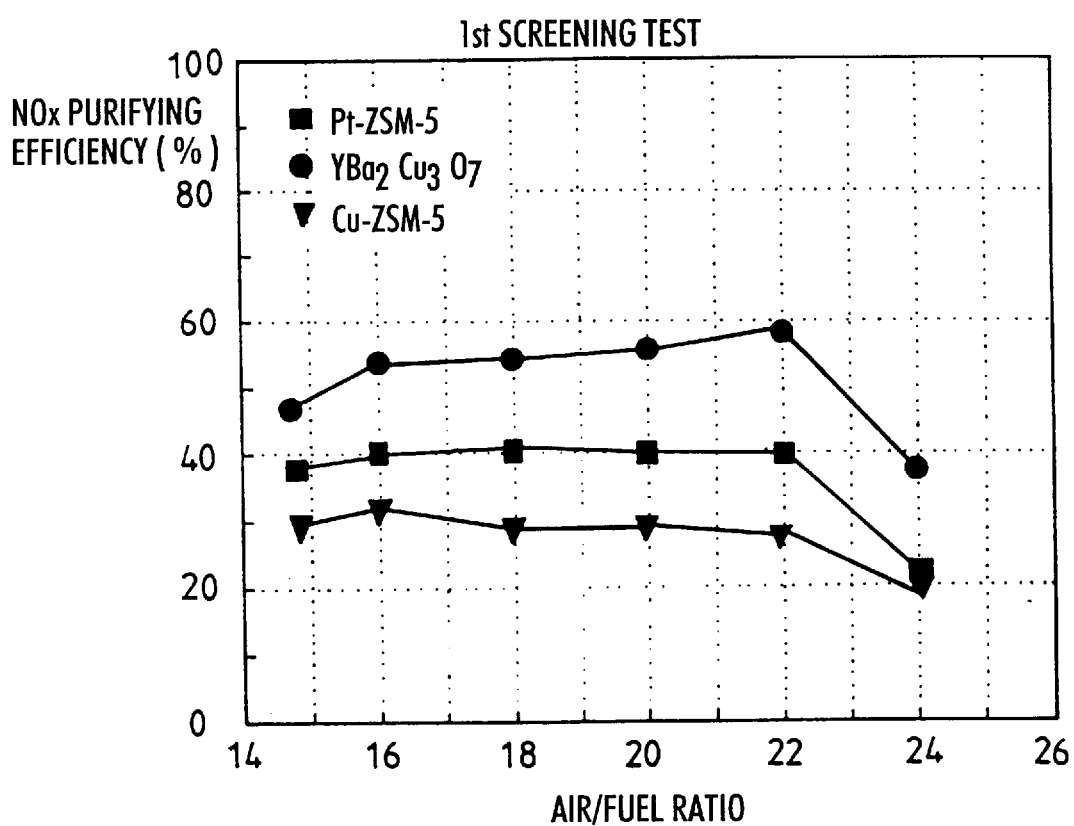
FIG. 5 is a graph comparing engine bench test results of $YBa_2Cu_3O_7$-d produced in accordance with example of the invention with those of Cu-ZSM-5 and Pt-ZSM-5.

To confirm the practical use possibility of $YBa_2Cu_3O_7$-d catalyst prepared according to the method of this invention, the engine bench test using $YBa_2Cu_3O_7$-d catalysts produced in example 2 and the conventional CU-ZSM-5 and Pt-ZSM-5 catalysts was performed at an A/F ratio of 22 and a catalyst temperature range between 350° C. and 400° C. The results of this test are shown in FIG. 5. As can be seen from this figure, the $YBa_2Cu_3O_7$-d catalyst prepared in example 2 has high efficiency in purifying $NO_x$ whereas the conventional Cu-ZSM-5 and Pt-ZSM-5 have low $No_x$ purifying efficiencies of 28% and 40% or less, respectively. It will be understood from this result that, the $YBa_2Cu_3O_7$-d catalyst prepared in accordance with the method of this invention can be a successful substitute for Cu-ZSM-5 and Pt-ZSM-5 in purifying $NO_x$ from exhaust gas.

As described above, $YBa_2Cu_3O_7$-d catalyst prepared in accordance with the method of this invention has higher activity by 10% than that of $YBa_2Cu_3O_7$-d catalyst prepared in accordance with the conventional co-precipitation method, as confirmed by the simulated gas test (zero Screening Test). In addition, $YBa_2Cu_3O_7$-d catalysts prepared in accordance with the present invention, has a lower Light-off Temperature by about 30° C. than the catalyst formed by the co-precipitation method. Moreover, in the test using the $YBa_2Cu_3O_7$-d catalyst coated on the monolith, the inventive $YBa_2Cu_3O_7$-d catalyst has shown $NO_x$ purifying efficiency of 70% or more. It was also evident through TPD analysis that the $YBa_2Cu_3O_7$-d catalyst, according to the present invention, can used as the absorption-type catalyst. Furthermore, it was proved through the engine bench test that the $YBa_2Cu_3O_7$-d catalyst prepared in accordance with the present invention, was a successful substitute for the conventional Cu-ZSM-5 and Pt-ZSM-5 catalysts. Therefore, it is concluded for these results indicates that the $YBa_2Cu_3O_7$-d catalyst prepared in accordance with the method of the present invention has an improved activity in purifying nitrogen oxide ($No_x$) in the presence of water vapor and excess oxygen, when compared to the conventional $YBa_2Cu_3O_7$-d catalyst produced through the co-precipitation method, and the conventional Cu-ZSM-5 and Pt-ZSM-5 catalysts.

Although this invention has been disclosed in terms of preferred embodiments and compositions, it will be understood that modifications and variations can be made within the scope of the invention as defined by the following claims.

What we claim is:

1. A method for preparing $YBa_2O_3Cu_3O_7$-d catalyst for purifying an exhaust gas, comprising steps of:

(a) mixing $Y_2O_3$, $Ba_2CO_3$ and CuO at a mole ratio of 1:4:6, respectively, to prepare a mixture, (b) performing a first grinding of the resultant mixture to obtain fine powder;

(c) sintering the fine powder obtained in the first grinding step at a temperature of 800° C. to 900° C.

(d) annealing the fine powder from the sintering temperature to room temperature;

(e) pelletizing the powder from the annealing step to form pellets;

(f) performing a second grinding of the pellets from the pelletizing step to obtain fine powder;

(g) re-sintering the resultant fine powder obtained in the second grinding step at a re-sintering temperature of 800° C. to 920° C.; and (h) re-annealing the fine powder from the re-sintering temperature to room temperature.

2. The method of claim 1, wherein the step of pelletizing, second grinding, re-sintering, and re-annealing are further repeated at least three times.

3. The method of claim 1, wherein the first grinding step is carried out by a grinder for 9 to 11 hours.

4. The method of claim 1, wherein the size of the powder obtained in the grinding steps is at least 200 mesh.

5. The method of claim 1, wherein the sintering step is carried out at a temperature of about 850° C.

6. The method of claim 1, wherein the re-sintering step is carried out at a temperature of about 900° C.

* * * * *